Patented Apr. 29, 1930.

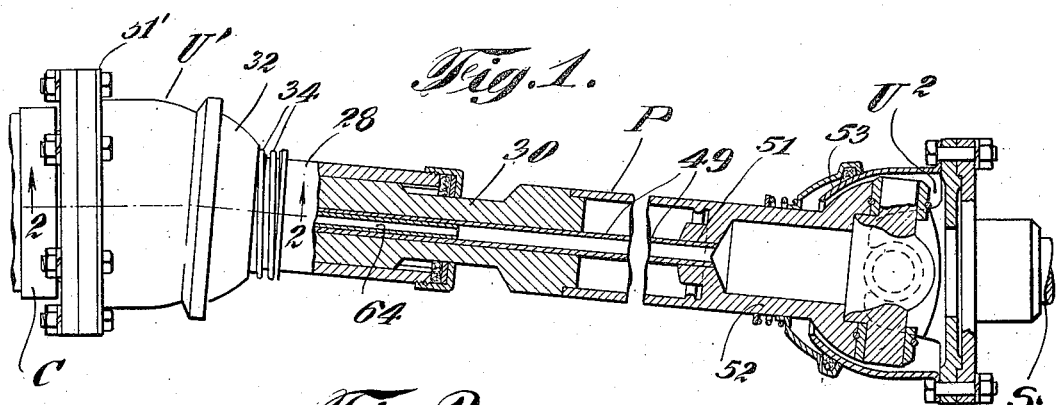
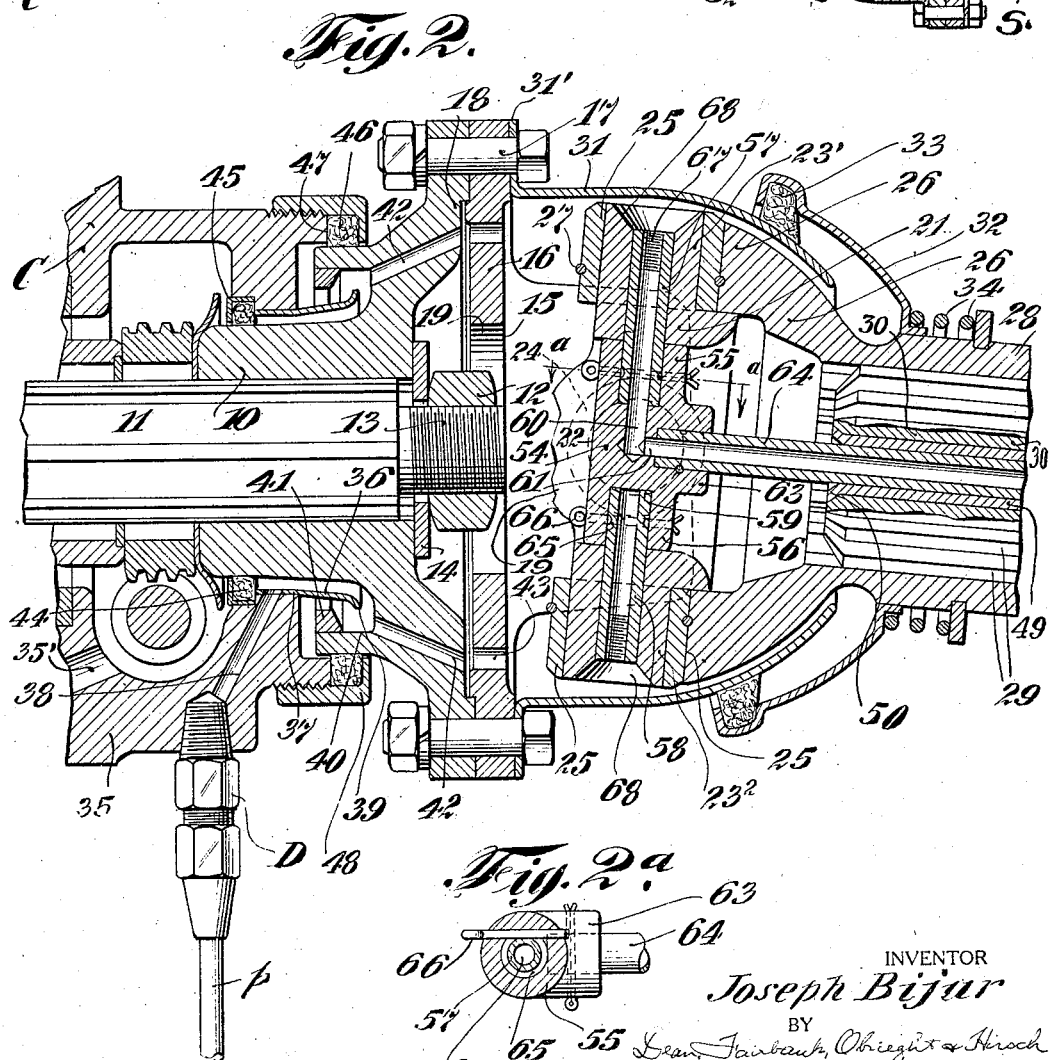

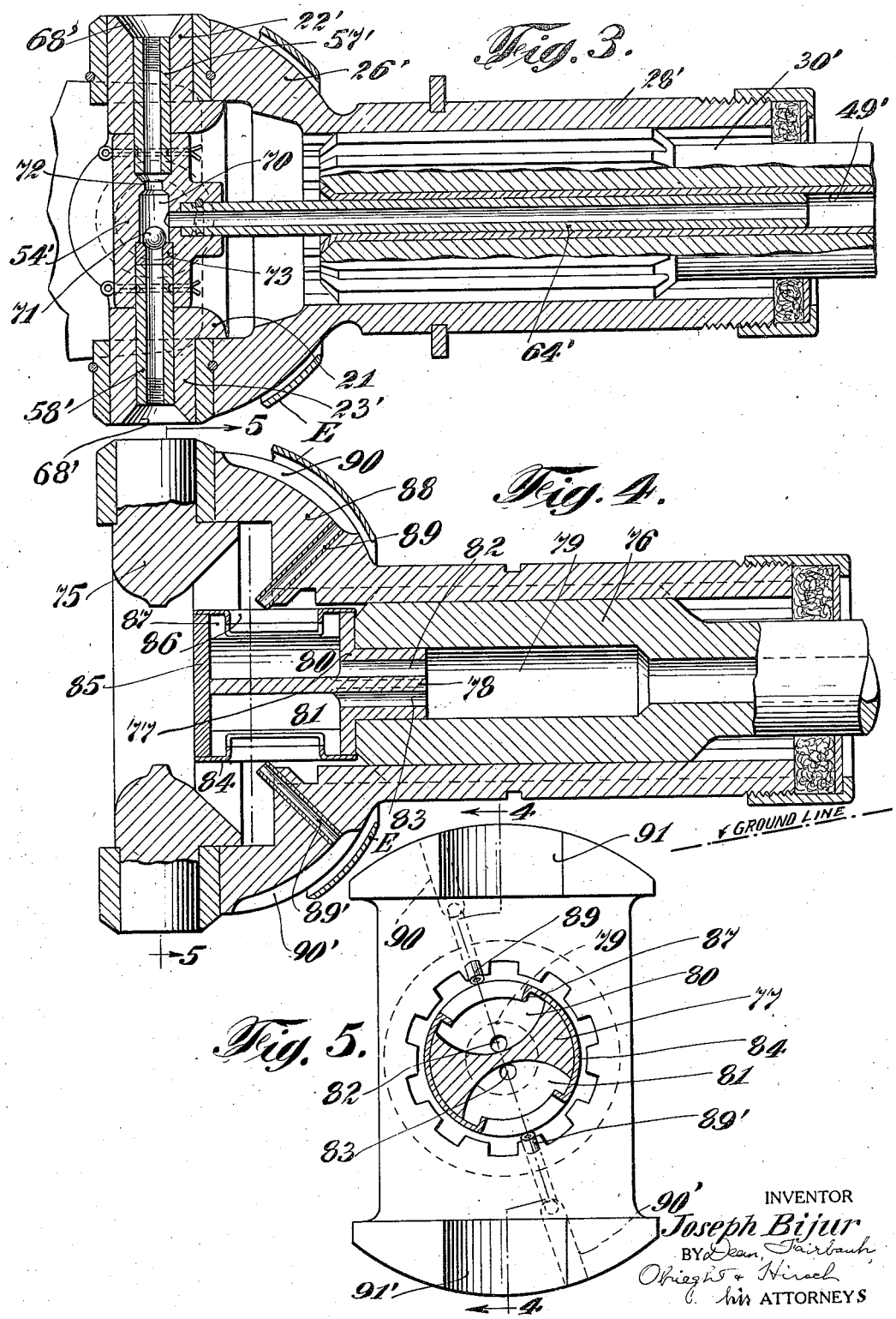

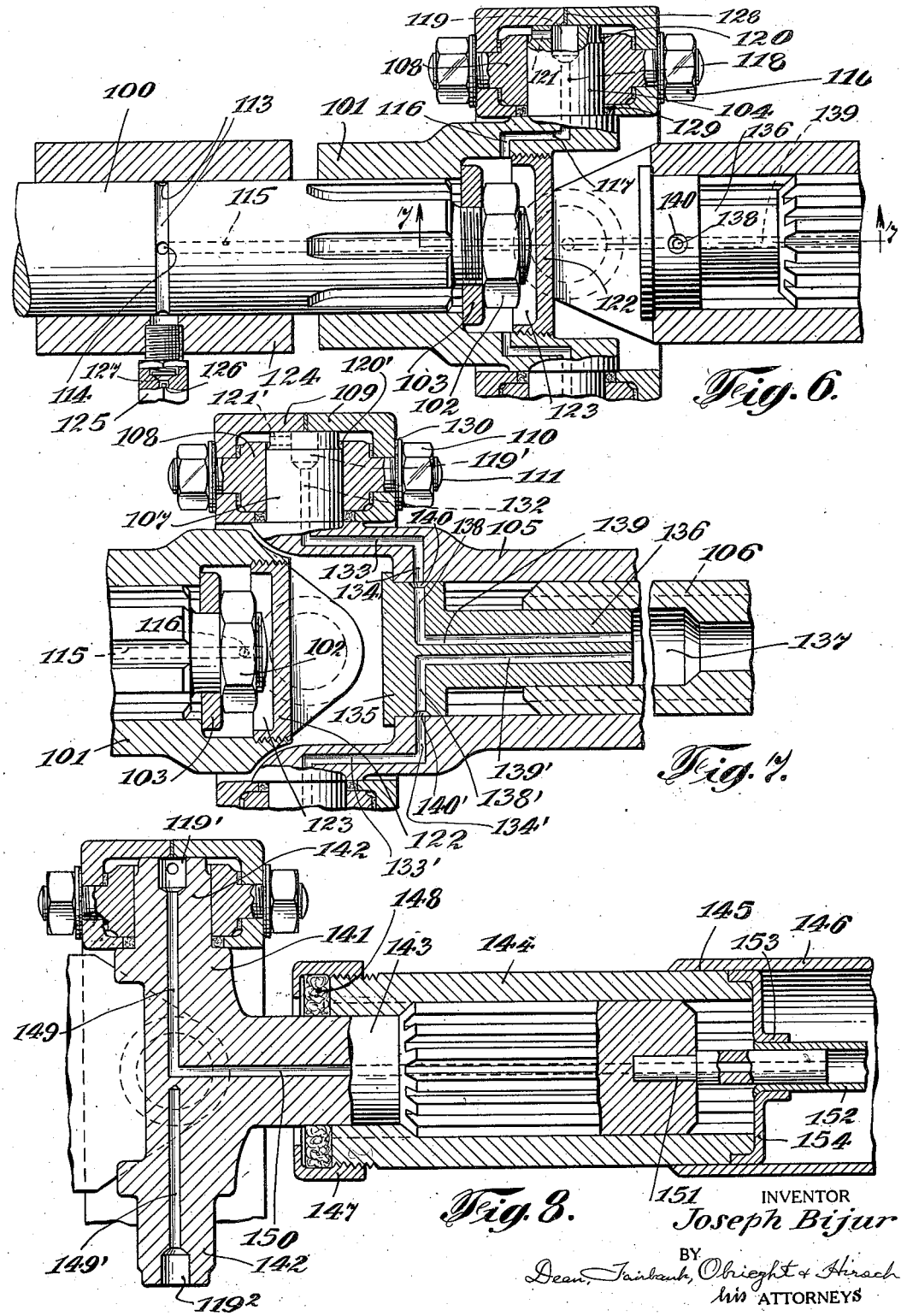

1,756,336

UNITED STATES PATENT OFFICE

JOSEPH BIJUR, OF NEW YORK, N. Y., ASSIGNOR TO AUTO RESEARCH CORPORATION, A CORPORATION OF DELAWARE

TRUNNION JOINT AND THE LUBRICATION THEREOF AND OF ASSOCIATED PARTS

Application filed March 25, 1925. Serial No. 18,092.

My present invention relates to lubrication and is shown embodied in the propeller shaft assembly of a motor vehicle power transmission, although it has a broader field of application to the lubrication of transmission elements and assemblies in power trains for other uses.

By my invention, I seek broadly to facilitate adequate, yet economical lubrication of various bearings of the propeller shaft assembly, without the inconvenience of opening or removing any closures, or the need for direct manual access to the separate constituent parts of the assembly.

The invention is more especially concerned with that type of propeller shaft assembly in which the lower universal joint is to receive its lubricant by automatic flow through a connecting passage lengthwise of the propeller shaft, said passage supplied from an oil containing chamber enclosing the trunnion bearings of the upper universal joint.

It is among the objects of the invention to assure the economical supply to the lower universal joint, of lubricant adequate for its needs, without excessively draining the upper universal, or incurring leak therefrom past a loose slide shaft.

Another object is to accomplish the feed desired, without the need, to this end, for maintaining the upper universal filled with a considerable volume or to a predetermined level of lubricant, and without the likelihood of return to the upper universal of lubricant once passed therebeyond on its way to the lower.

Another object is to provide a construction of the type referred to, the lubricating a result of such modifications, any unbalanced stresses in the operation of the assembly, or affording access for dirt, dust or water to the bearing surfaces, or in any other way impairing the effectiveness and reliability of operation, the ruggedness of construction or the ease of installation of such assemblies.

The desired results are accomplished by disposing the forward end of the connecting passage which supplies the rear universal joint, in front of the forward end of the propeller shaft, and affording sufficient clearance or permitting sufficient retraction of said passage end to accommodate the telescoping movement of the slide shaft.

The forward or inlet end of the connecting passage may be supplied from an oil segregating conformation such as a pocket, gutter or groove carried by and revolving with the joint. Thus, after the pocket comes to rest at a level sufficiently above that of the passage, lubricant collected by said pocket will pass by gravity into and through the connecting passage in the propeller shaft, onward to the rear universal joint.

In a desirable specific embodiment, the pocket comprises a depression or well in the end of one of the studs of the universal joint trunnion ring which depression drains in a direction inward of the trunnion ring into an arm of a junction fitting of T form mounted in the opening of the trunnion ring and delivering at its stem to a connecting pipe. Preferably the depression is connected to the arm of the T junction fitting by a short length of connecting pipe, which serves as a pivot pin for said fitting, and the forward end of the propeller shaft passage may constitute a pipe extending into the stem of the T fitting and valve is provided in the junction fitting in this case, to assure delivery of the pocketed lubricant to the propeller shaft rather than return thereof to the enclosure of the universal joint.

In another embodiment, the lubricant intercepting device is carried wholly by the forward end of the propeller shaft and has one or more inlets supplied through drip pipes aligned therewith and carried wholly by the revolving structure of the universal joint, said pipes, in turn, supplied from grooves or pockets in the structure of the universal joint.

It is preferred to maintain the forward universal joint properly charged, without the need for opening or removing any closure of, or for any manual access to the joint and without even the need for stopping the revolution of the joint while applying the lubricant.

In the application of the invention to an embodiment of universal joint, the trunnion bearings of which are enclosed in a reasonably oil-tight casing intended to function fully charged with oil, lubricant may be admitted to said filled universal joint by way of an appropriate inlet at the bearing of the driving terminal, through a passage in said terminal into the oil-charged enclosure, thereby causing ejection of a corresponding charge from said enclosure, through a passage in the driven terminal, delivering onward to the other bearings to be lubricated.

Certain of the subject matter of this case not specifically claimed herein is the subject of a copending application Serial No. 437,972 filed March 22, 1930.

In the accompanying drawings in which are shown one or more of various possible embodiments of the several features of this invention, Fig. 1 is a side elevation partly in section of my propeller shaft assembly, Fig. 2 is a sectional view on an enlarged scale of the forward end thereof, Fig. 2$^a$ is a detail sectional view taken on any of lines $a$—$a$ of Fig. 2, Fig. 3 is a fragmentary sectional view of an alternative form of the invention shown in Fig. 2, Fig. 4 is a sectional view taken along the line 4—4 of Fig. 5, showing a different embodiment of the invention, Fig. 5 is a sectional view thereof taken along the line 5—5 of Fig. 4, Fig. 6 is a fragmentary sectional view of an alternative embodiment, Fig. 7 is a fragmentary sectional view taken along the line 7—7 of Fig. 6, and Fig. 8 is a view similar to Fig. 7 of another embodiment.

Referring now to Figs. 1 and 2 of the drawings, I have shown a propeller shaft assembly of a motor vehicle, which comprises a transmission case C driving the propeller shaft P through a universal joint, which in its entirety is represented by letter U′, the lower or rear end of the shaft P being connected through another universal joint indicated in its entirety by letter U$^2$ to the differential driving shaft S at the rear or driving axle.

The universal joint U′ in general construction is of a well known type in common use, modified, however, according to my invention to permit ready admission of lubricant thereto for the bearings thereof and transmission of a portion of the lubricant therefrom to lubricate the bearings of the universal joint U$^2$ at the opposite end.

The universal joint comprises an annular mounting or base plate 16 bolted as at 17 to the flange 18 of the mounting terminal, the latter including a hub 10 splined over driving shaft 11 and secured against coming off the shaft by a nut 12, threaded, and preferably locked upon the end of the shaft projection 13 against a metal washer 14 which coacts with the end of hub 10. The mounting flange 16 has diametrically opposite yokes 19 for a trunnion ring 21 provided with four bearing lugs or studs at intervals of a quadrant, one pair of diametrically opposite lugs 22 bearing in bushings 24, positioned in the yokes 19 the other pair of bearing lugs or studs 23′ and 23$^2$ extending into bushings 25 in a corresponding yoke 26 of the driven forging.

The bushings 24 and 25 are of diameter larger than the open length between the arms of yokes 19 and 26, which length, in turn, exceeds the diameter of studs 23, so that in assembly, the bearing lugs 22 of the trunnion ring are inserted between the arms of the yoke by movement toward the base plate, whereupon the bushings are inserted over the ends of the bearing studs and locked in place by lock rings 27, fitting in corresponding peripheral grooves about the bushings, and the bearings 23′ and 23$^2$ are then similarly assembled with respect to the driven forging 26.

Forging 26 has an integral extension sleeve 28 internally splined as at 29 over the correspondingly splined forward head 30 of the propeller shaft P. The universal joint is enclosed in a shell comprising a main shell portion 31 having a flange 31′ secured in position against the base plate 16 by the same bolts and nuts 17 which secure said plate to the flange 18, said main shell portion closed by a complementary or cover shell portion 32 mounting a ring of felt 33 and urged by a coil spring 34 into contact with said main shell portion.

For conveying lubricant to the universal joint, I apply in the fixed cast head 35 which is secured to the transmission case and which encircles the hub 10 and preferably below the shaft 11, a flow-control fitting such as a drip plug D which may be supplied from a remote source of lubricant through a pipe *p*. An outwardly flaring generally cylindrical sheet metal guide 36 is preferably press-fitted into a corresponding annular support 37 in the casting and the lubricant from the drip plug is fed thereto through an oblique bore 38 in casting 35. The guide drips at its outwardly flaring periphery 39 into an annular trough 40 having its concavity directed inward and formed integrally with the flange on the driving hub. This trough may be formed as a cylindrical flange integral with flange 18, having friction-fitted at the inside thereof, a ring 41. The flange 18 is also formed with outwardly directed oblique bores 42 adapted to drain the trough 40 and preferably in alignment with bores 43 through the base plate 16, said latter bores shown horizontal, though they may be outwardly inclined, if desired. Preferably the collar 35 is provided with a drain 35′ through which any dirty lubricant leaking from the transmission case will escape to the ground, thereby avoiding admixture with the clear lubricating oil admitted through fitting D for the universal joint. To maintain the construction dust-tight, a packing washer 44 held by an appropriate metal backing 45 is forced into a corresponding countersink at the rear or inner end of the head 35 and a similar packing 46 encircling the trough 40 is pressed against an upstanding rim 47 on the head and is secured in position by a threaded cap 48.

The construction thus far described, in its essence, is shown and claimed in my copending application, Serial No. 720,927, filed June 19, 1924. The present application is an improvement over the disclosure of said prior application and claims said features of improvement both alone and in combination with the features common to the two applications.

In order to transmit lubricant from the universal joint enclosure 31 to the rear universal joint U², the propeller shaft is preferably made hollow and encloses an oil conveying pipe 49 extending the length thereof. The forward end of pipe 49 has a flare 50 fitting in a corresponding depression in the end of head 30 and the rear end fits into a corresponding bore 51 at the rear head 52 from which latter lubricant passes into the enclosure 53 of the rear universal joint U².

For delivering lubricant that has previously been admitted into the enclosure 31—32 of universal joint U′, to the pipe 49, the conventional construction of universal joint is modified in manner that will now be described. Within the trunnion ring 21, I provide a T-shaped junction fitting 54, the arms 55 and 56 of which extend into alignment with the two studs 23′—23² that bear in the driven forging 26. The T fitting is mounted in the trunnion ring by a pair of pins 57 and 58 extending respectively axially through studs 23 with a tight fit therein and protruding inward therebeyond for a bearing or pivoting fit respectively into the corresponding arms 55 and 56 of the T fitting, bottoming at shoulders 59. The T fitting 54 has a bore 60 therein aligned with a corresponding bore in the pin 57 which is formed as a tube, and communicating with bore 61 at right angles thereto, directed rearward axially of the stem or leg 63 of the T member. In said latter bore, there is friction-fitted the forward end of a pipe 64 telescoping into the pipe 49 in the propeller head 30.

For added security of the pins, tubes or pipes 57, 58 and 64, they are preferably provided each with a peripheral groove 65 as shown and cotter pins 66 transversely through the T member are lodged tangentially of said grooves. Preferably the tubes 57 and 58 are provided with threaded outer ends 67 to which an appropriate tool (not shown) can be applied by means of which, they may be forcibly withdrawn, should there ever be occasion to disassemble the unit. The studs 23′ and 23² are countersunk as at 68 for a purpose appearing more fully below.

It will be understood that lubricant admitted through the drip plug D while the engine is stationary, would be fed upward through bore 38 to the baffle 36, whence it flows into the trough 40 which, in turn, is drained through the lowermost oblique duct 42 and horizontal duct 43 to feed into the enclosed universal joint. Lubricant may, however, be admitted even while the joint is revolving rapidly, since fitting D is always fixed. In this case, the revolving baffle 41 sheds into the trough 40 from which the lubricant is thrown outward by centrifugal force through the outwardly directed bores 42 into the universal joint enclosure. The trough 40 being a rigid part of the driving hub, which does not wobble or slide, the inlet drip plug D can be disposed in fixed position and requires no flexible feed pipe as would be needed were said fitting mounted on a member sliding with shaft P for instance. Lubricant from the fixed drip plug D is intercepted without loss by trough 40 which trough spins in a plane substantially fixed in space, as opposed to a construction providing a trough on the trunnion or other wobbling member, which might be out of true alignment with the element supplying lubricant, at the time the latter is functioning. My trough revolving true without wobbling, the dust-excluding felts 44 and 46 are, moreover, effective, a result obtainable with difficulty, if at all, were the trough to perform a wobbling motion with respect to the head surrounding it.

Lubricant which has collected within the enclosure 31—32 will be hurled about and agitated and find its way to the various bearing surfaces of the universal joint and some will creep outward to lubricate the splined slide shaft 30 and the outside of pipe 64, which latter performs a sliding motion within pipe 49 as the rear vehicle springs compress and rebound. When the universal joint happens to come to rest with the stud 23' above pipe 64, for instance, as shown in Fig. 2, such lubricant as has been intercepted thereby at the countersunk well, depression or pocket 68, will then drain through the tube 57, bores 60 and 61, thence lengthwise of pipe 64 from the end of which it drips to pipe 49, and thence rearward through the length of the propeller shaft into the enclosure 53 of the rear universal joint U², from which the bearings of the latter are lubricated by splash. As the probabilities are approximately, one in three or four that the stud 23' will come to rest at a point sufficiently above the axis of the universal joint, to supply the lower universal, it will be seen that every third or fourth stop of the vehicle, a charge of lubricant from the well or pocket 68 will be fed to the rear universal joint.

While I prefer to employ the well or pocket conformation, to pick up small individual charges of lubricant from the enclosure of the forward universal joint for transmission to the rear joint, other means may be used for segregating these lubricant charges.

It will be understood that the pin 58 aside from providing a pivot bearing for the T fitting 54, performs no oil feeding function but it is made tubular as its companion 57 for symmetry of construction, which obviates unbalanced radial stresses in operation.

The compression and rebound of the rear vehicle spring in operation, will be accommodated in part by rocking of the trunnion ring and the driven terminal 26 about the pivot stud 21 and in part by rocking of the driven terminal about the corresponding pivot pins 23' and 23² and of the tube 64 with the T fitting 54 about the pivot pins 57 and 58 of the latter.

It will thus be seen that when the enclosure 31—32 of the forward universal joint is kept supplied with a usual charge of lubricant by occasional replenishment through drip plug D, the rear universal is amply supplied therefrom by small charges at frequent intervals and without any likelihood of draining the forward universal. The intermittent charges of lubricant are effectively transmitted to the rear universal joint, through a substantially continuous uninterrupted conduit, so that the loss in transit which might be incurred by feeding the lubricant transversely across an excessively loose slide bearing 28 is precluded. Moreover, the construction is devoid of any protruding elements that might be injured or of any opening through which dust, dirt or water might be admitted to the bearing surfaces.

By my invention, it is apparent that I need merely add the T junction fitting 54, the tubes 57 and 58, the pipe 64 and the felts 44 and 46 to a construction of universal joint, standard, except that it is drilled to provide the various ducts or passages already described.

In assembly, it is seen that the pipe 64 protruding slightly as it does beyond the sleeve 28 affords a ready guide or pilot for telescoping thereover the head 30 of the propeller shaft. The construction, as seen, necessitates no large diameter bore or substantial modification of the propeller shaft, nor does it depend in any way on accurate positioning of the rear axle, since the pipe 49 telescopes with a very wide range of adjustment over the pipe 64. It will also be seen that the forward end of the propeller shaft is of conventional construction, so that in disassembly, should said end be allowed to drop onto a stone or concrete pavement, no injury will result. It will also be seen that my universal joint can be completely assembled at the factory and for assembling the vehicle, there is no need for separately handling any small constituent parts of the universal likely to be lost.

It will be understood that the means for feeding from an enclosed universal joint, a fraction of the charge to supply another universal joint or other bearing, may be used advantageously, regardless how the first universal is charged, or maintained charged. It will also be understood that my arrangement for charging a universal joint with lubricant may be used in other relations, disassociated with any means for feeding a fraction of the charge onward to other bearings.

In Fig. 3 in which a fragment of a modified form is shown, similar parts are designated by the same reference numerals as in Figs. 1 and 2 primed, however.

The T fitting 54' has a cage 70 therein for a ball valve 71. This valve has a seat 72 integral with the T fitting and near tube 57', the ball valve 71 being admitted to the cage through a bore of sufficient diameter, through which the separate seat member 73 is also admitted, and then locked in place by tube 58'.

In operation, should the joint come to rest with the tube 57' sufficiently above the horizontal axial plane, it will be understood that the ball 71 would drop against seat 73 and lubricant intercepted by well or pocket 68' would pass downward through tube 57' and thence, since the valve 71 prevents lubricant from draining back to the enclosure of the universal joint, the lubricant proceeds outward through pipe 64' to the rear universal. Should the joint come to rest with the tube 58' sufficiently above the horizontal plane, lubricant intercepted by the corresponding well or pocket 68' would flow downward to the rear universal joint, the ball valve 71 seated at 72 preventing any lubricant from draining back to the enclosure of the universal joint.

It will be understood that the present construction would effect lubrication of the rear universal twice as often relative to the number of stops of the vehicle, as in the embodiments of Figs. 1 and 2.

In Figs. 4 and 5 is shown an alternative arrangement for conveying lubricant from the forward universal joint of the type shown in Figs. 1 to 3, rearward along the propeller shaft. In this construction, the trunnion ring 75 is left unmodified from standard construction. A special oil intercepting member is carried by the end of shaft head 76 and comprises a generally cylindrical metallic element 77 of outer diameter slightly smaller than that of the head 76, a reduced stud 78 of which is friction-fitted into a corresponding bore 79 in the head 76. The element 77 is machined by providing two large generally semi-cylindrical depressions or wells 80 and 81 cut from diametrically opposite sides of the larger end thereof and extending nearly to the stud 78. Wells 80 and 81 communicate respectively at their innermost parts with corresponding bores 82 and 83 through the reduced stud 78. Preferably a cylindrical sleeve 84 is friction-fitted over member 77 and encircles at its outer end a metal button 85 closing the open ends of wells 80 and 81. Sleeve 84 has generally rectangular hatches 86 registering with the wells 80 and and 81, the metal at the edges of said hatches being bent inward to provide pockets 87 at the sides and ends of the wells.

In the driven forging 88, there is friction-fitted an oblique tube 89, the outlet end of which is ordinarily adjacent the middle of one of the hatches 86, the usual markings that serve for proper alignment of the two universals, being of assistance also in bringing about this relation. Any oil in pipe 89, if the latter is positioned above said hatch, would drip into the latter. Preferably an oil pocket in the form of a groove 90 serves as a feeder for the pipe 89, said groove being formed generally longitudinally of the outside of the driven forging 88 and sloping toward the axial plane from one side of the stud 91. The construction just described is duplicated at the diametrically opposite part of the driven forging, corresponding parts of said duplicate construction having the same reference numerals primed.

In operation, when the vehicle comes to rest, either pipe 89 or pipe 89' will extend above member 77. Lubricant that has been intercepted or pocketed during previous operations by the groove 90 or 90', will flow downward by gravity into and through tube 89, thence dropping directly through the corresponding hatch 86 into the corresponding well 80 or 81, whence it passes onward through the corresponding bore 82 or 83 into the propeller shaft and thence rearward lengthwise thereof to the rear universal joint in the same manner as in Fig. 1.

The lubricant splashed in the enclosure E by the vibration in movement and by the splashing therethrough of the revolving structure will spread to lubricate the splined slide bearing of head 76, in the same manner as heretofore described in connection with other embodiments. It will be seen that in the sliding movement at the splined bearing due to vehicle spring compression and rebound, the member 77 will move as a rigid unit therewith, but by reason of the substantial length of the hatches 86, the delivery drip tube 89 or 89' will be at all times in proper registry to deliver thereinto. Lubricant that may still remain in one of the wells 80, 81 when the universal joint resumes operation, is not hurled out into the enclosure E but passes by centrifugal force along the curved bottom of the well against the pockets 87, and drops back to the bottom of the well and onward through the propeller shaft, after the joint again comes to rest in suitable position.

In Figs. 6 and 7 I have shown an application of the invention to another type of universal joint, also embodied in a propeller shaft assembly. In this case, the driving shaft 100 has splined thereto the sleeve or hub 101 of the driving terminal, a nut 102 threaded on the end of said shaft pressing against a washer 103 which keeps the hub in place. The driving terminal has a pair of diametrically opposite trunnion studs 104 integral therewith directed outward therefrom. The driven terminal is a construction generally similar to that of the driving terminal and has a sleeve or hub 105 splined over the head 106 of the propeller shaft and has a pair of diametrically opposite trunnion studs 107 extending radially outward therefrom. Trunnion collars 108 encircle the various trunnion studs, and are all enclosed in an annular trunnion ring, comprising a pair of annular troughs 109 in edge to edge relation, scalloped to embrace the bases of the studs 104 and 107 and contacted at their outer peripheries by the heads of said studs. Nuts 110 threaded upon the projecting ends 111 of the trunnion collars 108 maintain the two halves of the trunnion ring 109 clamped in assembled relation.

To admit lubricant to the universal joint described, I have shown a construction alternative to that shown, in Figs. 1 to 5. The driving shaft 100 is provided with a peripheral groove 113 communicating through a radial bore 114 with an axial bore 115, which extends clear through the end of the driving shaft. The driving terminal 101 is provided with a bore extending outward as at 116 from beyond the end of the shaft 100, thence longitudinally as at 117 to the axis of one of the driving bearing studs 104 and thence longitudinally of said stud as at 118 to an enlargement or well 119 in the end of the stud. The stud is of reduced diameter at its outer end to provide a peripheral trough 120 therebetween and the encircling trunnion collar 108, said trough supplied from the well 119 through the bore 121 radially of the stud. A screw cap 122 closes the end of the driving hub 101, so that the chamber 123 determined by the hub 101, the cap 122 and the washer 103 will discharge lubricant admitted thereto only by way of bore 116, 117, 118 to the annular chamber determined by the trunnion ring 109.

Any appropriate inlet device or fitting may supply lubricant to the universal joint. A preferred construction is a drip plug 125 of my invention, threaded into a corresponding socket in the fixed bearing 124, said drip plug including a highly restricted outlet 126 and a relief valve 127 normally closed. A number of drip plugs may be operated from a single source of pressure to supply a multiplicity of bearings concurrently in a central lubricating system. The drip plug being in a fixed element, it will function whenever pressure is applied at the source and will admit lubricant to the trunnion ring of the universal joint regardless whether the joint at the time is stationary or in rapid rotation.

Preferably the halves of the trunnion ring are maintained substantially oil-tight by an interposed gasket 128 between their rims, compression washers 129 encircling the bases of the trunnion studs and compressed by the scalloped edges of the troughs and the inner ends of the trunnion collars and further compression washers 130 encircle the studs 111 on the trunnion collars 108 and are maintained compressed by the coacting nuts 110.

In order to feed some of the lubricant previously admitted to the universal joint onward therefrom to supply other bearings and specifically, in the present construction, to supply the lower or rear universal, I have shown the construction appearing most clearly in Fig. 7. In this construction, the driven terminal 105 is provided with a passage generally similar to that of the driving terminal and including as said latter terminal, a bore 132 axially of one of the trunnion studs 107, communicating with a longitudinal bore 133, thence radially inward as at 134 to deliver at a part of the driven terminal beyond the end of the head 106. The construction of well, trough and radial bore of the stud 107 are identical with those of stud 104, and bear corresponding numerals primed.

A plug 135 press-fitted into the open end of the sleeve 105 completely closes the same and has integral therewith an axial extension 136 of reduced diameter having a slide fit in a corresponding axial bore 137 in the head of the propeller rod. The plug has a radial bore 138 enlarged at its outer end 140 and registering with the bore 134, but terminating short of the plug axis and communicating through a longitudinal bore 139 therethrough with the bore 137. The arrangement of bores described is symmetrically duplicated as shown, and designated by the same reference numerals primed, as are also the bores in the two jaws of the driven yoke.

The oil containing trunnion ring 109 in a construction such as described, it will be seen, is substantially oil-tight, except, of course, for the entry bore 118 from the driving terminal and the delivery bore 132 to the driven terminal. Accordingly, if as is preferred, the trunnion ring chamber is maintained completely filled with lubricant as well as the chamber 123, the admission of any lubricant by way of drip plug 125 will immediately effect the ejection or displacement of a corresponding amount of lubricant from the trunnion ring 109, which lubricant must pass from the enclosure 109 through the bore 121', well 119' and bore 132—3—4, thence to bore 138 and bore 139, longitudinally through the propeller shaft to the other universal joint. Where the arrangement of bores is duplicated as shown, lubricant would at the same time pass in the manner just described through the corresponding ducts represented by primed numerals.

Accordingly, by providing a reasonably lubricant-tight oil enclosure, as described, preferably of small volume, it is feasible to maintain a body of lubricant, filling all the interstices of the structure of the universal joint and capable of transmitting pressure therethrough from the supply fitting 125 to cause a corresponding emission from the universal joint to the associated structure. The operation of the present embodiment is not dependent on the vehicle coming to rest before the lower universal joint can receive a charge of lubricant, but, whenever the source of lubricant pressure is operated, a charge of lubricant is promptly emitted from the upper universal joint to pass onward to the lower universal joint, regardless whether at the time of such pressure operation, the vehicle is stationary or in rapid motion.

It will be understood that the interstices of the joint may be initially filled and kept filled by supplying the lubricant by way of the drip plug 125, said lubricant passing through groove 113, bore 114 and bore 115 to chamber 123 thence through bore 116, 117, 118, to well 119 and through bore 121, into the trunnion ring or enclosing shell 109.

Whether the trunnion ring is maintained completely filled with lubricant or only partly filled, there takes place in addition to the operation just described, an operation generally similar to that of the embodiments of Figs. 3 to 5 above described.

More particularly, when after an operation, the universal joint happens to come to rest with either stud 107 or 107' of the driven terminal extending generally upward or at an angle of say less than 45 degrees from the vertical, a small part of the lubricant, which during motion has been hurled to the outermost side of the trunnion ring, will find its way through the bore 121' to well 119' and thence by gravity flow through bore 132—133—134 and groove 138, bore 139 and axial bore 140 or through the corresponding passages designated by primed numerals into the shaft head and thence onward. The charge passed from the trunnion ring is but small and is delivered only when the universal joint comes to rest with its enclosed stud 107 or 107' within a particular range of approximately 90 degrees. According to the laws of probability, approximately every other time that the vehicle comes to rest, a small charge will be supplied from the universal joint rearward. It will be understood that when the source of pressure is next operated, the supply from the drip plug in excess of that which replaces any small loss previously incurred by drainage from the upper universal, as just described, is advanced through said universal joint, in accordance with the pressure operation previously set forth.

In this embodiment as in Figs. 1 to 3, lubricant is admitted to the propeller shaft from the universal joint independently of the splined shaft 106. Some of the lubricant that has passed through pipe 136 will lubricate the slide bearing thereof in bore 137 and sufficient will escape beyond the end of said slide bearing to adequately lubricate the splined shaft 106.

The presence of the lubricating instrumentality in no way interferes with the satisfactory operation of the universal joint or with the action of the slide shaft 106. In the compression and rebound of the rear spring and the accompanying rise and fall of the rear axle, the slide shaft together with the associated driven terminal and its conduit will hinge about the corresponding trunnion studs in the associated trunnion rings as an axis.

In Fig. 8 is shown an alternative arrangement for supplying lubricant from a universal joint of the general type shown in Figs. 6 and 7 to associated bearings. In this embodiment, the driving terminal (not shown), the trunnion ring and the trunnion collars therefor are identical with those of Figs. 6 and 7. The driven terminal is a unitary forging comprising a head 141 with integral diametrically opposite trunnion studs 142 and an integral axial splined stub shaft 143. About the stub shaft, I provide a splined sleeve 144 welded as at 145 to the propeller tube 146 and closed at its end by the screw cap 147 and packing material 148. The driven terminal is provided with a bore 149 radially of one of its trunnion studs 142 and axially to the middle of the head 141, and communicating with a bore 150 axially of the stub shaft 143. To maintain true balance of the revolving driven forging, the construction is made substantially symmetrical by forming well $119^2$ in bore 149'.

The lubricant is fed onward from the stub shaft to the rear universal preferably by a short pipe 151 friction-fitted in the extreme end of the stub shaft 143 and having preferably an inner diameter equal to that of the bore 150 and a slide fit in a tube 152 extending substantially the entire length of the propeller rod, substantially in the manner shown in Fig. 1. Tube 152 is preferably secured at its forward end within a hub 153 on a cap 154 friction-fitted in a corresponding groove in the end of the sleeve 144.

The operation of the present embodiment will be readily understood from the previous description. In this case, also as in the embodiment of Figs. 6 and 7, small charges of lubricant will pass from the universal joint to the associated structure whenever the joint comes to rest in a definite relation. In addition, if, as is preferred, the interstices of said universal joint are completely filled, then every time lubricant is admitted under sufficient pressure, a corresponding charge will pass out from well 119' through bore 149 and bore 150 regardless whether the universal joint at the time of such lubricant admitting operation, is stationary or in rapid rotation.

I claim:—

1. In a mechanical transmission, in combination, a lubricated trunnion joint, associated mechanism, means for supplying lubricant from said trunnion joint to said associated mechanism, said means comprising a conduit leading outward from the trunnion joint, a lubricant feeder carried by a rotating part of the trunnion joint and delivering lubricant to said conduit, a fixed inlet supplying said feeder, and means preventing leak of lubricant from the course of flow between the inlet and the feeder.

2. In a transmission mechanism, in combination, a universal joint, an enclosure for the trunnion bearings of said joint, a protruding delivery conduit to supply another part of said mechanism with lubricant from said enclosure, lubricant feeding means carried by a revolving part of the universal joint and communicating with said conduit to deliver thereto when said feeding means comes to rest at a level materially higher than said conduit and means distinct from said conduit for supplying lubricant to said feeding means.

3. In a transmission mechanism, in combination, a universal joint, a shaft in driving relation with respect thereto, a lubricant containing enclosure for the bearings of said joint, a delivery conduit communicating from the interior of said enclosure through said shaft to lubricate other bearings with lubricant supplied therethrough from said enclosure, a lubricant intercepting conformation carried on a revolving part of said universal joint and supplied from said enclosure, said conduit draining said intercepting conformation and means distinct from said conduit through which lubricant may be introduced into said enclosure.

4. In a transmission mechanism, in combination, a universal joint, a shaft in driving relation with respect thereto, a lubricant containing enclosure for the bearings of said joint, a delivery conduit communicating from the interior of said enclosure through said shaft to lubricate other bearings with lubricant supplied therethrough from said enclosure, a trough conformation carried on a revolving part of said universal joint, said conduit revolving with said part and draining the lubricant intercepted by said trough and means distinct from said conduit through which lubricant may be introduced into said enclosure.

5. In a transmission mechanism, in combination, a universal joint, a shaft driven therefrom, an oil containing enclosure for the bearings of said joint, said joint comprising a pair of terminal forgings, a trunnion ring connecting said forgings in driving relation, a lubricant conduit longitudinally of said shaft protruding therebeyond, means carried by the revolving structure of said universal joint and draining to the protruding end of said conduit and means distinct from said conduit through which lubricant may be introduced into said enclosure.

6. In a mechanical transmission, in combination, a universal joint having a driving forging, a driven forging, and trunnion means in torque transmitting relation therebetween, said driven forging having an integral splined construction, a driven shaft in telescoped relation therewith and adapted to slide with respect thereto in the operation of the transmission, an oil containing enclosure for the bearings of said universal joint, oil intercepting means protruding beyond the end of said shaft, an oil intercepting conformation on the revolving structure of the universal joint delivering into said intercepting means, said latter means being constructed and arranged to be in oil intercepting relation with respect to said conformation in all positions of said slide shaft and means distinct from said intercepting means for supplying said segregating means.

7. In a mechanical transmission, in combination, a universal joint having a driving forging, a driven forging and trunnion means in torque transmitting relation therebetween having an oil containing enclosure, said driven forging having an integral splined construction, a driven shaft in telescoped relation therewith and adapted to slide with respect thereto in the operation of the mechanism of the transmission, an oil segregating conformation carried by the revolving structure, a drip conduit extending through the revolving structure and dripping inward from said conformation toward the axis of revolution of said shaft, and oil intercepting means extending into the enclosure beyond the end of said shaft and having a telescoping relation with respect to said shaft to permit the slide action of the latter.

8. In a transmission mechanism, in combination, a universal joint, a shaft in driving relation with respect thereto, said joint including a driving terminal, a driven terminal, trunnions therefor extending radially of said joint, a trunnion ring maintaining the trunnions of the two terminals at right angles to each other, a trough associated with one of said trunnions and a drain conduit extending through said trunnion and inward through structure associated with the driven terminal, and delivering longitudinally into and through the shaft.

9. In a transmission mechanism, in combination, a universal joint including a driving terminal, having radial bearings, a trunnion ring coacting with said bearings, a driven terminal having radial bearings with respect to said trunnion ring at right angles to the bearings of said driving forging, a shaft in splined relation with said driven terminal, a lubricant enclosure for the trunnion bearings, a lubricant conduit axially of one of the trunnion bearings of said driven terminal, supplied from said enclosure and extending through structure associated with said driven terminal and delivering longitudinally into and through said shaft and means distinct from said conduit through which lubricant is introduced into said enclosure.

10. In a transmission mechanism, in combination, a universal joint including a driving terminal having radial bearings, a trunnion ring coacting with said bearings, a driven terminal having radial bearings with respect to said trunnion ring at right angles to the bearings of said driving terminal, a shaft splined with respect to said driven terminal, a lubricant conduit having a part axially of and rigid with one of the trunnion bearings of the driven terminal and extending inward through structure associated with said terminal, and a part rigid with and delivering axially from said structure into the end of said shaft, said latter conduit part slidable with respect to said shaft, said structure having a rocking relation with respect to said trunnion ring.

11. A universal joint structure including a driving terminal, a driven terminal, a trunnion ring therebetween having two pairs of diametrically opposite studs bearing in said respective terminals, and an oil containing enclosure; the combination of means with said joint for delivering controlled quantities of lubricant therefrom to associated structure, said means including an oil segregating conformation at the exterior of the revolving structure, a drip pipe extending through the revolving structure, and dripping inward from said conformation toward the axis of revolution of the joint, oil intercepting means for said drip pipe associated with one of said terminals and a pipe conveying the intercepted lubricant outward from the joint.

12. In a transmission mechanism, in combination, a universal joint, an oil containing enclosure for the bearings thereof, said joint including a driving forging, a driven forging, and a trunnion ring substantially enclosed between said forgings and having studs protruding outward therefrom and bearing in said forgings, an oil trough at the exterior of said trunnion ring, and draining inward by gravity flow through the trunnion ring, and a conduit substantially along the axis of revolution of the joint, to intercept at a part thereof beyond the shaft end, the lubricant drained from said trough, said conduit conveying said lubricant onward to lubricate other parts.

13. In a mechanical transmission, in combination, a universal joint having a driving forging, a driven forging, a trunnion ring having one pair of diametrically opposite studs extending outward therefrom and bearing in said driving forging and a similar pair of diametrically opposite studs at right angles to said first pair and bearing in said driven forging, said driven forging having an integral splined sleeve, a driven shaft telescoped into said splined sleeve and adapted to slide with respect thereto, an oil containing enclosure for said universal joint, and means for delivering from said enclosure controlled charges of lubricant to a longitudinal passage through said shaft, said means comprising a lubricant tube revolving with the universal joint structure, within the enclosure and beyond the end of said shaft, and means revolving with the shaft and protruding inward from the end thereof, through which the lubricant is delivered from said tube, whereby lubricant is delivered through said shaft independently of any lubricant for the splined sleeve thereof.

14. In a transmission mechanism, in combination, a universal joint, a shaft driven therefrom, an oil containing enclosure for said joint, tubes extending inward from opposite points of that element of the joint which is connected to said shaft, and an outlet pipe longitudinally of said shaft and so disposed relative to one of said tubes as to intercept any discharge therefrom.

15. The combination set forth in claim 14 in which each of the tubes is supplied from an oil intercepting concavity revolving with the joint.

16. The combination set forth in claim 14 in which the oil intercepting element is constructed and arranged to prevent flow of lubricant admitted thereto from one of the tubes, outward therefrom toward the opposite tube, whereby the lubricant admitted will pass onward through the outlet pipe.

17. In a transmission mechanism, in combination, a universal joint, a shaft driven therefrom, an oil containing enclosure for said joint, said joint including a driving forging, a driven forging, and a trunnion ring substantially enclosed between said forgings and having studs protruding outward therefrom and bearing in said forgings, a depression in the end of one of said studs constituting an oil trough, a trunnion conduit longitudinally of said stud draining said trough to the opening in the center of said trunnion ring and a shaft conduit longitudinally of said shaft extending into said opening to intercept lubricant from said trunnion conduit and means distinct from said shaft conduit through which said enclosure is supplied with oil.

18. In a transmission mechanism, in combination, a universal joint, a shaft driven therefrom, an oil containing enclosure for said joint, said joint comprising a driving forging, a driven forging, a trunnion ring transmitting torque from one to the other of said forgings, said trunnion ring including bearing studs extending radially outward into said forgings, a junction fitting fixed in the opening of the trunnion ring and revolving therewith, a lubricant inlet supplied from said enclosure and extending from substantially the periphery of the revolving structure inward to said junction fitting and an outlet conduit pipe longitudinally of said shaft supplied from said junction fitting, said junction fitting and said inlet pipe affording a substantially balanced structure.

19. In a transmission mechanism, in combination, a universal joint, a shaft driven therefrom, an oil containing enclosure for said joint, said joint comprising a driving forging, a driven forging, a trunnion ring transmitting torque from one to the other of said forgings, said trunnion ring including bearings studs in said forgings, a junction fitting of T form in the open structure of said trunnion ring, a delivery pipe axially through said shaft and secured at the stem of said T fitting, tubes longitudinally of the trunnion studs of the driven forging and extending longitudinally into the arms of the T fitting to maintain it assembled to the trunnion ring, one of said tubes being in fluid conveying communication with said junction fitting to drain thereinto and thence to said delivery pipe when said tube comes to rest in a position extending downward from its outer end to said junction fitting.

20. In a transmission mechanism, in combination, a universal joint, a shaft driven therefrom, an oil containing enclosure for said joint, said joint comprising a driving forging, a driven forging, a trunnion ring transmitting torque from one to the other of said forgings, said trunnion ring including bearing studs in said forgings, a junction fitting of T form fitting in the open structure of the trunnion ring with its arms aligned with the studs of the driven forging, and its stem extending toward said shaft, a delivery pipe fitted in said stem and extending through a corresponding longitudinal bore in said shaft, a pair of tubes extending longitudinally into the arms of the T fitting from the corresponding studs of the trunnion ring, said studs providing oil intercepting troughs at the outer ends of said tubes, the entire construction being balanced to avoid lateral strains, one of said tubes being in fluid conveying communication with said delivery pipe, so that when the joint comes to rest with said tube extending upward above said outlet pipe, lubricant previously intercepted at the corresponding trough will drain therethrough to said outlet pipe.

21. In a transmission mechanism, in combination, a universal joint, a shaft driven therefrom, an oil containing enclosure for said joint, said joint comprising a driving forging, a driven forging, a trunnion ring transmitting torque from one to the other of said forgings, said trunnion ring including bearing studs in said forgings, a junction fitting of T type having its arms extending diametrically within the ring and aligned with the studs thereof corresponding to said shaft, bearing members fixed longitudinally of said studs extending into and supporting said T arms a delivery pipe longitudinally and axially of said shaft and extending into the stem of said T fitting, one of said bearing members being hollow to provide an inlet duct, said junction fitting providing a passage therein communicating from said inlet duct to said delivery pipe, said inlet duct, the diametrically opposite bearing and said junction fitting providing a balanced structure.

22. In a transmission mechanism, in combination, a universal joint, a shaft driven therefrom, an oil containing enclosure for said joint, said joint comprising a driving forging, a driven forging, a trunnion ring transmitting torque from one to the other of said forgings, said trunnion ring including bearing studs in said forgings, a junction fitting of T structure having its cross bar aligned with the studs that bear in the driven forging, tubes extending longitudinally of said studs into the arms of said T fitting and affording bearings for the same, said studs being countersunk to provide troughs at the outer ends thereof, a delivery pipe axially of said shaft extending therebeyond into the stem of said T fitting, said junction fitting having an elbow passage therein establishing communication between one of said tubes and said delivery pipe, whereby when said tube comes to rest with the trough thereof above said delivery pipe, lubricant intercepted by the trough will pass through the corresponding tube by way of the junction fitting out to and through the delivery pipe.

23. In a transmission mechanism, in combination, a universal joint including a driving terminal, a driven terminal and a trunnion ring therebetween, said driven terminal having a splined sleeve, a shaft telescoped therein and driven therefrom, an oil retaining enclosure for said universal joint, said shaft having a longitudinal passage therethrough for conveying lubricant from said universal joint, a lubricant interceptor having a stud fitting into the inner end of said bore and having collecting structure extending inward therebeyond into said enclosure, a lubricant trough at the driven terminal of the universal joint, and a drip pipe through said terminal draining said trough into said lubricant intercepter.

24. A mechanism of the type including a lubricated joint which revolves with the structure that retains the lubricant for the rocking bearing surface thereof, a lubricant inlet apart from the revolving structure, means revolving with the joint, intercepting the lubricant from the inlet and delivering to the lubricant retaining structure, and means revolving with the joint, segregating a charge of lubricant from the structure and delivering said charge by gravity flow from out of the universal joint to supply other bearings.

25. A propeller shaft construction including at its forward end a lubricated universal joint of the type which revolves with the structure that retains the lubricant thereof, a conduit lengthwise of the propeller shaft delivering to the rear universal joint, lubricant intercepting means that revolve with the forward universal joint, a lubricant inlet apart from the revolving structure and delivering to said intercepting means, said intercepting means delivering to the lubricant retaining structure of the universal joint, the revolving structure of said forward universal joint including a trough conformation intercepting lubricant from the retaining structure, and means delivering the intercepted charge by gravity flow into the forward end of the propeller shaft for transmission therethrough to the rear universal joint.

26. In apparatus of the character described, in combination, shafts, an interposed universal joint having terminals in driving relation with said shafts, an oil containing enclosure for said terminals, an annular trough encircling one of said shafts and rotating as a part rigid therewith, a fixed collar contiguous to said trough and having a lubricant inlet delivering to said trough, one or more passages through the rotating structure for conveying lubricant from said trough to supply said enclosure, a delivery conduit protruding beyond the other said shaft toward said universal joint, to supply mechanism associated with said other shaft with lubricant from said enclosure, and lubricant feeding means revolving with said universal joint and located between said trough and said other shaft and communicating with said conduit to deliver thereto when said feeding means comes to rest at a level materially higher than said conduit.

27. In an automotive vehicle, in combination, a transmission case, a drive shaft protruding therefrom, a propeller shaft, a universal joint drivingly connecting said shafts, means for supplying lubricant to said universal joint, said means comprising a collar encircling said protruding shaft and fixed with respect to said transmission case, a lubricant inlet therein, an annular trough coaxial with said driving shaft and rotating with said universal joint for intercepting lubricant delivered through said inlet, and one or more ducts connecting said trough for supplying lubricant to the universal joint bearings.

28. In a motor vehicle, in combination, a transmission case, a propeller shaft driven therefrom and an interposed universal joint, an annular trough rotating with said joint and at the side thereof toward said case and intercepting any lubricant tending to escape from the case, one or more ducts through the joint structure communicating from said trough to said joint, said trough having associated therewith an annular baffle to block escape by centrifugal force from between the case and the joint, of any lubricant intercepted in the trough.

29. A motor vehicle of the type including a transmission case having a protruding driving shaft, a propeller shaft, an interposed universal joint, packing between an annular part stationary with said case and a coacting annular part rotating with said joint, an annular barrier rotating with said driving shaft to impede the escape of lubricant to said packing, an annular trough rotating with said universal joint to intercept any lubricant on its way toward the barrier, and ducts for ready flow of the lubricant from said trough into the universal joint.

30. In a motor vehicle construction, in combination, a transmission case having a protruding drive shaft, a propeller shaft, a universal joint connected between said shafts, an annular trough coaxial with said drive shaft to intercept lubricant escaping from the case, a fixed collar encircling said drive shaft, a lubricant inlet therein in substantially open communication with said trough, and one or more ducts communicating from said trough to said universal joint.

Signed at New York city in the county of New York and State of New York this 9th day of March, A. D. 1925.

JOSEPH BIJUR.